(No Model.)
J. BAKER.
FRUIT AND VEGETABLE WASHER.
No. 295,715. Patented Mar. 25, 1884.
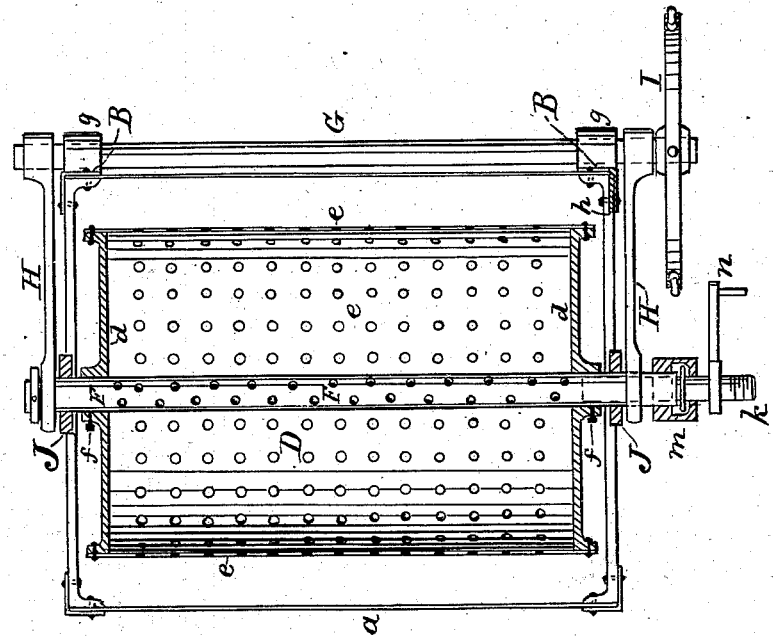
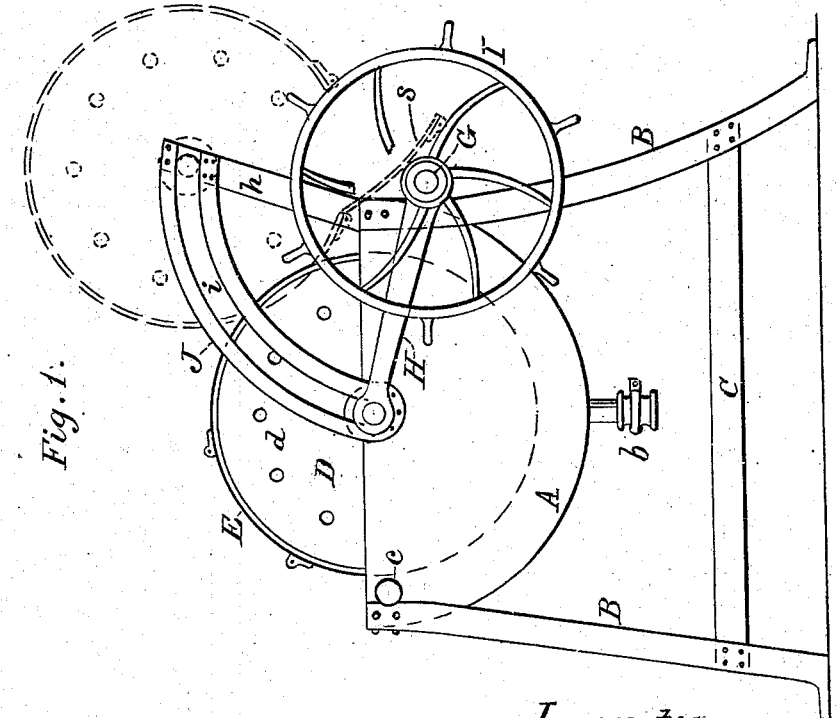
Witnesses:
Inventor:
John Baker
By W. Burris
Attorney

UNITED STATES PATENT OFFICE.

JOHN BAKER, OF MUSCATINE, IOWA.

FRUIT AND VEGETABLE WASHER.

SPECIFICATION forming part of Letters Patent No. 295,715, dated March 25, 1884.

Application filed October 29, 1883. (No model.)

*To all whom it may concern:*

Be it known that I, JOHN BAKER, a citizen of the United States of America, residing at Muscatine, in the county of Muscatine and State of Iowa, have invented certain new and useful Improvements in Apparatus for Washing Fruit and Vegetables, of which the following is a specification, reference being had therein to the accompanying drawings.

This invention relates to apparatus for washing fruit and vegetables; and it consists in certain improvements in the construction of the same, as hereinafter described and claimed.

In the accompanying drawings, Figure 1 represents an end elevation of a vegetable-washer having my improvements. Fig. 2 is plan view of the apparatus, the washing cylinder being shown in section.

A designates a tank or water-reservoir, which is semicircular in form, the heads or end pieces being usually of cast-iron and having a sheet-metal casing, $a$, secured thereto. The tank has an outlet and cock, $b$, at the bottom, for discharging water, and a waste-pipe, $c$, near the brim. The legs or standards B, which support the tank, are of angle-iron, and fit the corners, where they are firmly riveted to the tank, as shown in Fig. 2. They are further strengthened in position by the horizontal braces C.

D is a rotary washing cylinder or receptacle for fruit and vegetables to be washed, the perforated heads $d$ being usually of cast-iron and having a perforated sheet-metal casing, $e$, secured thereto. The cylinder is provided with a hinged lid, E, extending its entire length, for the purpose of filling and emptying the cylinder.

F is a perforated tubular shaft, passing lengthwise through the cylinder D, which is secured thereto by means of set-screws $f$, the shaft having its bearings in the heads of the tank, as shown.

G is a shaft extending along the front of the tank and having bearings $g$, secured to the front standards B. Two arms, H, are keyed or made fast at their forward ends to the shaft G, and are connected at their rear ends with the cylinder-shaft F. A lever or hand-wheel, I, is secured to shaft G for turning the same. Two guides, J, one being placed at each end of the tank, are fastened in position, as seen in Fig. 1, the lower ends being secured to the tank and the upper ends being fastened to extensions $h$ of the front standards B. These guides are constructed with slots $i$ for the shaft F, extending therein, and are formed each on a part of a circle the center of which would be in the shaft G. By turning the hand-wheel I, the shaft G, being partially rotated through the arms H, raises the cylinder D to the position indicated in dotted lines in Fig. 1, the cylinder-shaft moving along in the slotted guides; and the cylinder being brought to a position with the hinged lid downward, and the lid being allowed to fall open and rest against the tank, as indicated at $s$, the contents of the cylinder are discharged, the open lid forming a chute for their passage to a suitable receptacle. One end of the tubular shaft F is provided with a hose-coupling, $k$, and a stuffing-box, $m$, for the attachment of hose or a supply-pipe for conducting water into the tubular perforated shaft, from which the water passes through the contents of the perforated cylinder and into the tank, filling the same. The cylinder being then rotated by means of a crank, $n$, applied to the shaft F, the whole contents are thoroughly drenched and effectually cleansed, when the cylinder containing the washed vegetables or fruit is raised and emptied, as herein set forth.

I claim—

1. The combination, with the tank A, of the cylinder D, mounted on a shaft arranged in circular guides, and connected with the shaft G by means of the arms H, substantially as and for the purposes described.

2. The combination, with a tank, A, cylinder D, and circular slotted guides J, of the shaft G, connecting-arms H, and operating lever or wheel I, substantially as and for the purposes set forth.

3. The combination, with the tank A, of the cylinder D, having perforated ends $d$, and sides $e$, and mounted upon the tubular perforated shaft F, the slotted curved guides J, the shaft G, connecting-arms H, and operating-levers I, substantially as and for the purposes set forth.

In testimony whereof I have affixed my signature in presence of two witnesses.

JOHN BAKER.

Witnesses:
 CHAS. PAGE.
 C. A. WELTZ.